United States Patent [19]

Wadia

[11] 4,366,000

[45] Dec. 28, 1982

[54] METHOD AND APPARATUS FOR PREHEATING DRY RAW MEAL PRIOR TO INTRODUCTION OF THE MEAL INTO A SUSPENSION CYCLONE PREHEATER SYSTEM SUPPLYING A ROTARY KILN

[76] Inventor: Darius A. Wadia, 96 Marine Dr., Bombay, India

[21] Appl. No.: 310,771

[22] Filed: Oct. 13, 1981

[51] Int. Cl.$^3$ ............................................. C04B 7/02
[52] U.S. Cl. .................................. 106/100; 432/13; 432/106
[58] Field of Search ................. 106/100, 103; 432/13, 432/106

[56] References Cited

U.S. PATENT DOCUMENTS

| | | | |
|---|---|---|---|
| 3,235,239 | 2/1966 | Petersen | 106/100 |
| 3,317,201 | 5/1967 | Muller et al. | 106/100 |
| 3,761,582 | 9/1973 | Lippmann | 106/100 |
| 3,784,389 | 1/1974 | Hastrup | 106/100 |
| 3,887,388 | 6/1975 | Christiansen | 106/100 |
| 3,895,955 | 7/1975 | Kondo et al. | 106/100 |
| 3,925,091 | 12/1975 | Yoshida et al. | 106/100 |
| 3,986,886 | 10/1976 | Sylvest | 106/100 |
| 4,022,568 | 5/1977 | Meedom | 106/100 |
| 4,043,746 | 8/1977 | Ritzmann | 106/100 |
| 4,045,162 | 8/1977 | Christiansen | 106/100 |
| 4,083,676 | 4/1978 | Ritzmann | 106/100 |

Primary Examiner—James Poer
Attorney, Agent, or Firm—Thomas R. Vigil

[57] ABSTRACT

The method is used in processing raw meal such as cement raw meal, powdered limestone, alumina hydrate or the like, and includes the steps of metering the dry raw meal into a processing system, pneumatically pumping the raw meal in the processing system to a separate combustion chamber, supplying fuel to the combustion chamber and igniting same therein to heat the dry raw meal in the combustion chamber to a temperature between 100° and 500° C. Further, the heated dry raw meal is pumped to a preheater system through which it is processed and then supplied to a rotary kiln. In this way, the preheater decarbonative capacity is increased, and the higher temperature of the gas exiting from the preheater system provides recoverable heat. The thermal efficiency of the entire preheating system is thus increased.

An apparatus is provided for carrying out the processing of raw meal such as cement raw meal, and includes a dry raw meal hopper, a continuous pneumatic pump, a mechanism for metering dry raw meal to the pump from said hopper, and a separate combustion chamber having an inlet coupled to the outlet of the pump. Fuel is delivered to the chamber and a pilot flame therein ignites the fuel to heat the dry raw meal. The combustion is controlled so that the dry meal is heated to a temperature of between 100° and 500° C. and then fed to a cyclone preheater system which feeds a rotary kiln.

35 Claims, 2 Drawing Figures

METHOD AND APPARATUS FOR PREHEATING DRY RAW MEAL PRIOR TO INTRODUCTION OF THE MEAL INTO A SUSPENSION CYCLONE PREHEATER SYSTEM SUPPLYING A ROTARY KILN

BACKGROUND OF THE INVENTION

1. Field of the Invention

The field of the invention is methods and apparatus for improving the output and thermal efficiency of a combination rotary kiln with suspension cyclone preheater system. More specifically, the method and apparatus of the present invention are directed to preheating of dry raw meal before introducing it to the first stage of a multistage suspension cyclone preheater system.

2. Description of the Prior Art

Rotary kilns equipped with suspension cyclone preheater systems have achieved considerable popularity since their introduction in the early 1950's. The standard four stage cyclone preheater system is by far the most popular preheater system. Only a few single and two stage cyclone preheater systems are still in use since they have lower thermal efficiency and lower kiln productivity.

The outstanding advantages of suspension cyclone preheater systems are their low fuel consumption, the absence of moving parts (except for the preheater fan) and high kiln productive capacity in terms of tons of clinker per cubic meter of kiln volume.

In a typical suspension cyclone preheater system the hot gases leaving the rotary kiln flow from the bottom to the top of the four cyclone preheater stages while the raw meal passes from the top to the bottom in a direction opposite to the gas. Thus, in a suspension cyclone preheater system there is both a counter-current and a co-current movement of the gas and raw materials. Heat transfer efficiency is very high and the difference in temperature of raw material and gas after heat transfer in each of the cyclone preheater stages 1, 2 and 3 is only around 30° C. The time taken for the raw material to pass through the cyclone preheater system is well below 30 seconds, and even in this short time span, up to 40% decarbonation of the raw meal is achieved.

As a further development toward increasing productivity of suspension cyclone preheater systems, secondary furnaces/precalcinators have been introduced between the third and fourth cyclone preheater stages, whereby raw meal feed is substantially decarbonated—up to 90% decarbonation.

As a result, the kiln's productive capacity (tons/m³ of kiln volume) is considerably increased and it is possible to practically double the throughput for a kiln of given diameter as compared to a suspension cyclone preheater system without a precalcinator.

Present day kilns with precalcinators have capacities of over 7000 tons per day. Apart from completely new installations, precalcinators can also be provided for existing suspension cyclone preheater systems combined with a rotary kiln to obtain a significant increase in kiln capacity. The fuel consumption (net kcals/kg clinker) for syspension cyclone preheater systems combined with a rotary kiln with and without a precalcinator is substantially the same. The temperature of the raw meal leaving a suspension cyclone preheater system (with or without precalcinator) is typically maintained at around 830° C., since at higher temperatures there is an increased tendency for build-up of encrustations in the fourth stage cyclone preheater and its discharge pipe.

Also, to minimize the formation of such encrustations, the alkali, chloride and sulfate contents of raw meal are required to be within permissible limits. In practice where alkali and other constituents are marginally on the higher side (or where low alkali cement is required), a portion of the kiln exit gas stream is continuously brought out before its entry into the cyclone preheater system. Such a bypass system serves to void objectionable build-up of alkali and other constituents caused by the internal and external recycling of gases in the cyclone preheater system. Necessarily, however, fuel consumption is higher where exit gases are partially let off.

Typically the temperature of the exit gases from the first stage cyclone preheater of the cyclone preheater system (with or without precalcinator) is around 330° C. In some cement processing installations, the heat content of the exit gases is utilized for drying raw materials before or during grinding. The handling of large volumes of dust-laden low-temperature exit gases, however, is not very convenient. Further, raw grinding mills do not run on a continuous around-the-clock basis and therefore utilization of waste gas heat is on an intermittent basis.

Although installation of a fifth cyclone preheater stage would permit a lower exit gas temperature and an improved fuel efficiency such additional cyclone preheater stage is not considered advantageous because of additional power requirements of a preheater fan for such a stage.

Also electrostatic precipitators are commonly used for collection of dust prior to venting of the exit gases from the cyclone preheater system. Since the relatively dry exit gases are at a temperature of over 300° C., it is a common practice to provide a conditioning tower to cool and humidify the exit gases before they are passed through the electrostatic precipitator. In this way, dust collection efficiency is considerably improved and it is possible to have a smaller electrostatic precipitator.

Over the years a number of attempts have been proposed for improving the productive capacity of rotary cement kilns in terms of the tons of cement clinker produced and to improve the thermal efficiency of the kiln. Examples of prior art methods and apparatus for making cement are disclosed in the following patents:

| U.S. PAT. NO. | PATENTEE |
|---|---|
| 3,212,764 | Mueller et al. |
| 3,235,239 | Peterson |
| 3,317,201 | Heinz-Gertmuller et al. |
| 3,761,582 | Lippmann |
| 3,784,389 | Hastrup |
| 3,887,388 | Christiansen |
| 3,895,955 | Kondo et al. |
| 3,925,091 | Yoshida et al |
| 3,986,886 | Sylvest |
| 4,022,568 | Needom |
| 4,043,746 | Ritzmann |
| 4,045,162 | Christiansen |
| 4,083,676 | Ritzmann et al. |

Of particular note is the teaching of the Kondo et al. U.S. Pat. No. 3,895,955 which is concerned with the use of waste gases in stages of a cyclone preheater system for controlling the operating temperatures in the rotary kiln and using a fluidized calcinator having a separate heat source to increase the capacity of the rotary kiln and to enable the kiln to be operated continuously and stably for a long period of time.

Also of note is the Sylvest U.S. Pat. No. 3,986,866 which teaches drying of a raw meal slurry utilizing hot gases from a rotary kiln and a separate heater for providing supplementary hot gases to various stages of a multistage cyclone preheater system.

As will be described in greater detail hereinafter the method and apparatus of the present invention differ from the teachings of the prior art patents by providing a separate combustion chamber for preheating the dry raw meal and a dry raw meal cement processing apparatus prior to its being fed into the first stage cyclone preheater of a multistage cyclone preheater system. Moreover, the method and apparatus of the present invention can be utilized with or without an additional heat source or calcinator which is utilized between stages, e.g., the third and fourth stages, of a multistage cyclone preheater system.

SUMMARY OF THE INVENTION

According to the invention there is provided a method for processing raw meal such as cement raw meal, powdered limestone, alumina hydrate or the like, said method including the steps of: metering the dry raw meal into a processing system, pneumatically pumping said raw meal in said processing system to a separate combustion chamber, supplying fuel to said combustion chamber and igniting same therein, heating said dry raw meal in said combustion chamber to a temperature between 100° and 500° C., pumping said heated dry raw meal to a preheater system, processing said dry raw meal through said preheater system and supplying the preheated raw meal to a rotary kiln whereby the temperature of the gas exiting from the preheater system is increased to provide recoverable heat and whereby the thermal efficiency of said preheating system is increased.

Further, according to the invention there is provided an apparatus for processing raw meal such as cement raw meal, powdered limestone, alumina hydrate or the like, said apparatus including a dry raw meal hopper, a continuous pneumatic pump, means for metering dry raw meal to said pump from said hopper, a separate combustion chamber having an inlet coupled to the outlet of said pump, means for delivering fuel to said chamber, means for igniting said fuel in said chamber, said combustion of said fuel being controlled so as to heat said dry raw meal therein to a temperature of between 100° and 500° C., a cyclone preheater system, means for delivering said preheated dry raw meal to said cyclone preheater system, and a rotary kiln connected to the output of said cyclone preheater system.

DESCRIPTION OF THE PREFERRED EMBODIMENTS

Figure 1:
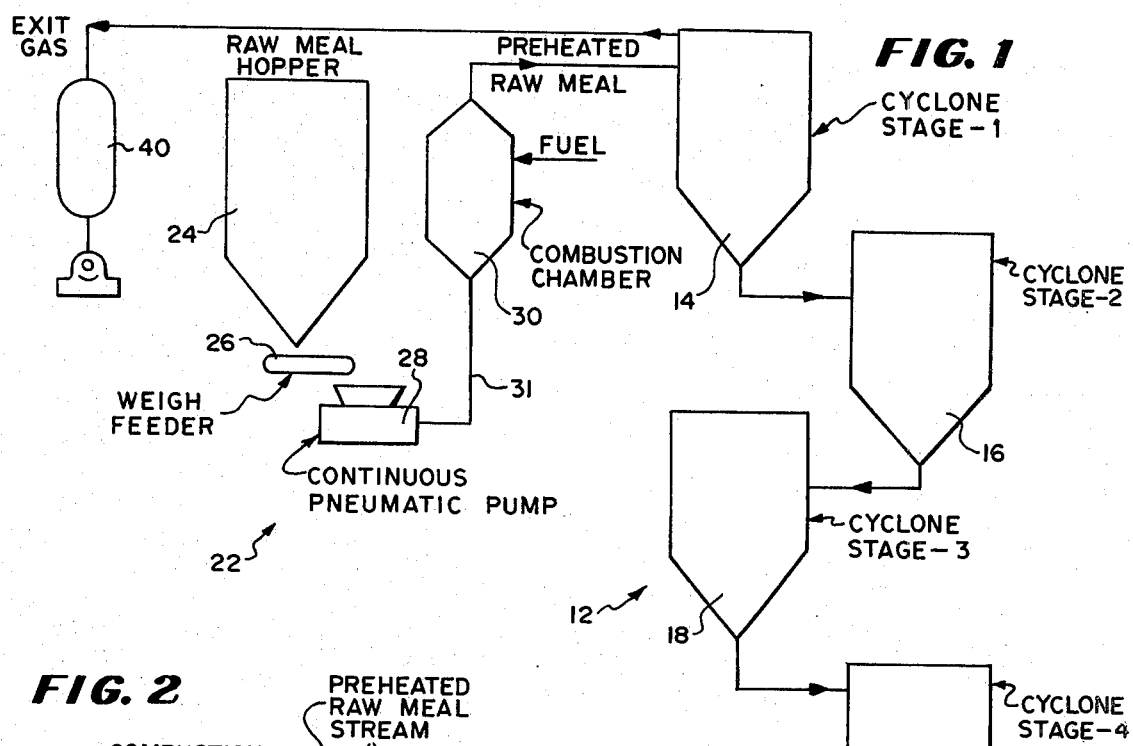
FIG. 1 is a block schematic diagram of one embodiment of the apparatus of the present invention showing a separate combustion chamber in the pneumatic transport line between a pneumatic pump and the first stage of a suspension cyclone preheater system which supplies heated meal to a rotary kiln.

Referring now to the drawings in greater detail there is illustrated schematically in FIG. 1 a rotary kiln 10 which is fed by a conventional four stage suspension cyclone preheating system 12 comprising a first stage cyclone preheater 14, a second stage cyclone preheater 16, a third stage cyclone preheater 18, and a fourth stage cyclone preheater 20. This combination of a four stage cyclone preheater system 12 and rotary kiln 10 is conventional.

According to the teachings of the present invention, there is provided a pumping and heating system 22 between a raw meal hopper 24 with weigh feeder metering device 26 and the first stage 14 of the cyclone preheater system 12.

This pumping and preheating system 22 includes a continuous pneumatic pump 28 which receives metered dry raw meal, such as cement meal, powdered limestone, alumina hydrate, or the like. More specifically, the pumping and preheating system 22 is particularly adapted for receiving and heating raw meal and then feeding it to the cyclone preheater system 12 and rotary kiln 10 to produce cement clinker.

The dry raw meal received by the continuous pneumatic pump 28 is pumped by the pump 28 to a separate combustion chamber 30 which is a low temperature heating chamber where the raw meal is heated to a temperature of between 100° and 500° C., typically up to a temperature of 400° C. Fuel such as oil, gas, or powdered coal, is fed into the combustion chamber and ignited by an oil or gas pilot flame provided therein. Alternatively, powdered coal can be mixed with the dry raw meal either in the raw meal hopper 24, at the weigh feeder 26, or at the inlet to the continuous pneumatic pump 28 and then pumped into the chamber 30 with the dry raw meal where the powdered coal is ignited to heat the dry raw meal to a temperature of between 100° and 500° C.

According to the teachings of the present invention and particularly the method of the present invention, dry raw meal for making cement clinker is dispensed from the hopper 24 to the weigh feeder 26 which meters dry raw meal into the continuous pneumatic pump 28. From there it is entrained in a pneumatic transport line 31 which feeds the separate combustion chamber 30 where the raw meal is preheated typically up to a temperature of 400° to 500° C. From there the preheated raw meal is fed to the first stage cyclone preheater 14 of the suspension cyclone preheater system 12 and rotary kiln 10 (with or without a precalcinator).

From numerical calculations it is estimated and believed that the introduction of the extra heat input into the suspension cyclone preheater system 12 by preheating the raw meal in the combustion chamber 30 permits an increase in the rotary kiln 10 output by up to 20% and an improved thermal efficiency.

Also according to the teachings of the present invention the extra heat which improves the kiln output and thermal efficiency can be recovered from the gases leaving the first stage 1 of the cyclone preheaters and utilized as desired. For example, the hot exit gases and the heat contained therein can be fed to a waste heat boiler 40 which forms part of an electric generating system.

For some applications, the heat content of the exit gases can be utilized for drying of raw materials prior to or during the grinding thereof. Also where raw meal is first prepared in a slurry, the heat content of the exit gases can be utilized for drying the slurry to produce dry raw meal which is then fed into a dry raw meal processing system of the type disclosed herein.

Another alternative would be to install an air preheater or heat transfer system in the input to a preheater fan, preferably in the duct through which incoming air is sucked into the preheater fan, for preheating the air prior to its insertion into the kiln 10. Such a fan 50 and preheater 60 are shown in FIG. 1.

For some cement plants, the primary emphasis would be on increased kiln output and lower capital cost and not on lowest possible energy consumption. In such case, the exit gas heat recovery systems described above would be eliminated. Instead, a conditioning tower would be provided on the suction side of the preheater fan for cooling and humidifying the exit gases. Even in this case, overall fuel requirements (inclusive of separate preheating of raw material) should be substantially the same as for existing suspension cyclone preheater systems fed with unpreheated raw meal.

Improved kiln performance is achieved because of the stage-wise pattern of heat transfer in a suspension cyclone preheater system. When preheated raw meal as taught by the present invention, is introduced into the preheater system, the temperature of the raw meal leaving cyclone stages 1, 2 and 3 are higher as compared to corresponding temperatures when feeding unpreheated raw meal. To illustrate this point there is set forth below calculation of: (a) the exit gas temperatures for a four-stage cyclone preheater that is fed with raw meal at different temperatures, (b) the resultant additional heat input into the preheater (net kcals/kg clinker output), and (c) the corresponding heat content of exit gases (assuming that they are cooled to 200° C.

| Temperature of raw meal feed to Cyclone 1* (°C.) | Additional heat input into preheater (kcals/kg clinker) | Temperature of gas leaving preheater** (°C.) | Available heat content of exit gas** (kcals/kg clinker) |
|---|---|---|---|
| 50 (unpreheated) | — | 330 | 68 |
| 100 | 18 | 370 | 90 |
| 150 | 36 | 430 | 121 |
| 200 | 53 | 500 | 158 |
| 250 | 71 | 550 | 185 |
| 300 | 89 | 590 | 204 |
| 350 | 107 | 625 | 222 |

*Raw material/clinker ratio is assumed to be 1.55.
**Exit gas quantity is assumed to be 2.2 kg/kg clinker. In practice, this value will be progressively lower with increasing raw meal feed temperature. Hence, exit gas temperature will be somewhat lower than the above indicated values.

It will be noted that with increasing raw meal temperature there is a corresponding increase in the exit gas temperature. In a conventional dry process kiln, an increase in exit gas temperature indicates an increase in exit gas volume (Nm³/kg clinker). When feeding preheated raw meal to a suspension preheater kiln, in spite of the increased exit gas temperature, there is a reduction in the exit gas quantity (Nm³/kg clinker). This is because of the reduced fuel input (net kcals/kg clinker) into the kiln or precalcinator. Exit gas volume (Nm³/kg clinker) is a significant yardstick for assessing a kiln's thermal efficiency.

In practice, it is not generally advantageous to preheat the raw meal beyond an optimum temperature limit (say 400° C. when feeding it to cyclone 14). An important criterion in this context is the exit gas temperature. If this is abnormally high, the full benefits of rapid and efficient heat transfer in the suspension preheater may not be attained. An exit gas temperature of around 600° C. can be considered a reasonable practical upper limit, since raw meal decarbonation generally begins at around this temperature.

As indicated earlier, the present invention aims at improving the productivity of suspension preheater kilns by feed of preheated raw meal in conjunction with recovery of the increased available heat content of exit gases. Thereby, overall energy requirements are reduced, and exit gas temperature is optimally reduced to below 350° C. to avoid problems in preheater fan operation.

A calculated example for a typical rotary kiln with a suspension four stage cyclone preheater system is set forth below.

In this calculated example, there is considered a rotary kiln having a suspension four stage cyclone preheater system (without a precalcinator) having a capacity of 1000 tons per day when fed with unpreheated raw meal. Then there is considered the case where such a kiln system is fed with raw meal that is preheated to 300° C. It is assumed that the heat recovered from the exit gases is utilized for raising steam such as in a waste heat boiler forming part of an electric generation system.

| Parameters for cement suspension preheater kiln when feeding: | Unpreheated Raw Meal | Preheated Raw Meal |
|---|---|---|
| 1. Temperature of raw meal feed (°C.) | 50 | 300 |
| 2. Temperature of gases leaving first stage cyclone (°C.) | 330 | 590 |
| 3. Raw material/clinker ratio | 1.55 | 1.55 |
| 4. Additional heat input introduced into preheater by preheating feed to 300° C. (kcals/kg clinker) | — | 89 |
| 5. Kiln thermal efficiency (kcals/kg clinker)-based on fuel introduced into kiln | 850 | (850-89) = 761 |
| 6. Kiln thermal efficiency (kcals/kg clinker)-total fuel input inclusive of preheating of raw feed to 300° C.) | 850 | 850 |
| 7. Exit gas quantity (kg/kg clinker) | 2.2 | 2.05 |
| 8. % CaCO₃ in raw feed | 77 | 77 |
| 9. Kiln output - tons clinker/day | 1000 | 1150* |
| 10. Recoverable heat content from exit gases leaving preheater at 590° C. when cooled to 250° C. (kcals/kg clinker) | — | 160 |

*Expected output, assuming that there are no constraints in preheater fan capacity, etc.

Figure 2:
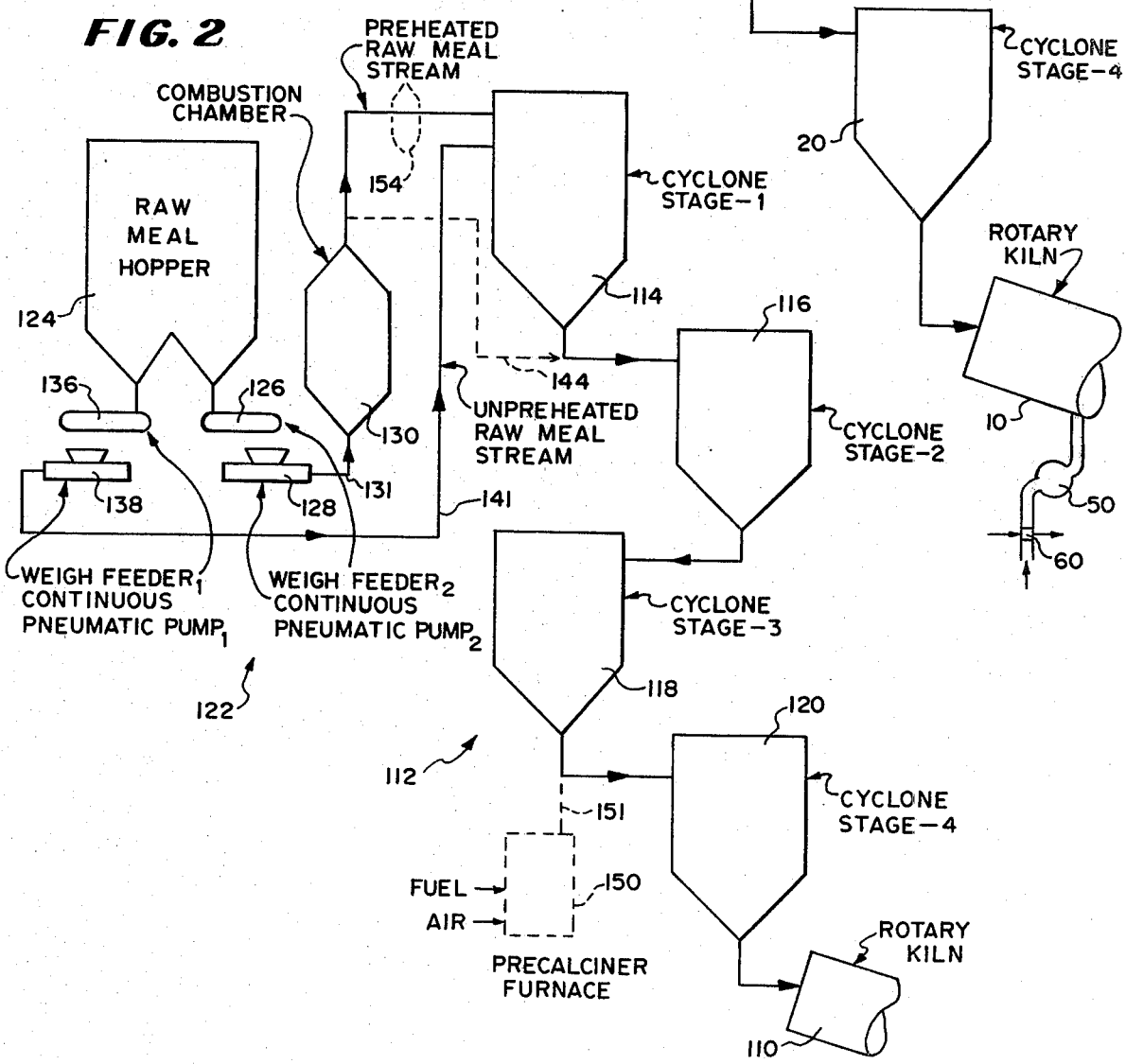
FIG. 2 is a block schematic diagram of another embodiment of the apparatus of the present invention showing the provision of a separate pneumatic air transport line for transmitting unpreheated dry raw meal directly to the first cyclone stage of the suspension cyclone preheater system which supplies heated meal to a rotary kiln.

Referring now to FIG. 2, there is illustrated therein a block schematic diagram of another embodiment of a present invention where a rotary kiln 110 is supplied with preheated raw meal from a four stage cyclone preheater system 112. As in the embodiment shown in FIG. 1, the cyclone preheater system 112 includes a first cyclone preheater 114, a second cyclone preheater 116, a third cyclone preheater 118 and a fourth cyclone preheater 120. The cyclone preheater system 112 is fed by a pneumatic pumping and preheating system 122. The pneumatic pumping and preheating system 122 has a weigh feeder 126 which receives raw meal from a hopper 124 and meters or dispenses the dry raw meal into a continuous pneumatic pump 128 which pumps the dry raw meal to a separate combustion chamber 130 which is serially connected in a pneumatic transport line 131 leading to the first stage 114 of the cyclone preheater system 112.

Additionally, the hopper 124 dispenses dry raw meal to a second weigh feeder 136 which meters or dispenses dry raw meal to a continuous pneumatic pump 138 which feeds the dry raw meal via a pneumatic transport line 141 to the first stage 114.

In this embodiment, raw meal is heated in the separate combustion chamber by fuel that is fed into the chamber 130 and ignited by a pilot flame located therein and fed by gas or oil. However, in this embodiment, unheated dry raw meal is fed directly via the continuous pneumatic pump 138 and the pneumatic transport line 141 to the first cyclone stage 114 where it is mixed with the preheated dry raw meal.

Typically, the two streams of dry raw meal, one preheated and one unpreheated, are mixed in a ratio of 1:1 in the first stage cyclone preheater 114. Typically, the temperature of the unpreheated stream of dry raw meal is approximately 50° C. and the preheated dry raw meal stream has been preheated to a temperature of approximately 500° C. When these two streams are mixed, the average raw meal preheat temperature will be approximately 325° C.

Another modification of the method and apparatus illustrated by the block schematic diagram in FIG. 2 is to feed a stream of unpreheated dry raw meal via transport line 141 to the first stage cyclone preheater 114 and then to feed the preheated stream of dry raw meal from the combustion chamber 130 via a transport line 144 shown in phantom to the second stage cyclone preheater 116. Alternatively, the transport line 144 could be connected to the inlet of the third stage cyclone preheater 118 or to the inlet of the fourth stage cyclone preheater 120.

With the embodiment shown in FIGS. 1 and 2 and the modifications discussed above, the exit gases from the first stage cyclone 14 or 114 will have a much higher temperature typically well over 400° C. and up to 600° C. which can be utilized in the manner described above or cooled as described above.

As another alternative, the preheating of the raw meal in a separate combustion chamber 30 or 130 can be included in a combination rotary kiln 10 or 110 and four stage suspension cyclone system 12 or 112 which utilizes a precalcinator furnace 150 which supplies additional heat via transport line 151 (both shown in phantom in FIG. 2) to the fourth stage cyclone preheater 20 or 120 as shown in FIG. 2.

As still another modification a second auxiliary burner-combustion furnace 154 can be provided between the chamber 30 or 130 and the first stage cyclone preheater 14 or 114 so that a better control of the temperature of the preheated dry raw meal can be obtained. Such an additional burner-combustion furnace will facilitate the maintaining of a steady desired preheated raw meal temperature.

It is to be appreciated that the additional heat introduced into the cyclone preheater system permits an increase in the preheater system's decarbonating capacity at the final stage of heat transfer in the fourth stage cyclone preheater 14 or 114. In this way it is possible to obtain an increase in the kiln output and a reduction in fuel input (net kcals/kg clinker) for the kiln or precalcinator.

The method and apparatus of the present invention also enable one to utilize low temperature heat, typically up to 400° or 500° C., for increasing the output of the suspension cyclone preheater and rotary kiln. Since the heat input is supplied through the lower stage cyclone preheaters, problems that normally arise from the build-up of accretions in the cyclone preheaters are minimized.

Also since the separate combustion chamber 130 can be added to a system having a transport line 141 which is already feeding unpreheated raw meal to the first stage cyclone preheater 114, there will be no operational problems in reverting to a direct feed of strictly unpreheated raw meal if and when desired.

Also it will be understood that the method and apparatus of the present invention can be utilized in other systems or pyroprocesses involving the use of a suspension cyclone preheater system such as, for example, in the calcination of granular powdered limestone, alumina hydrate, or the like.

It is also to be noted that in conventional pneumatic conveying of raw meal feed to a preheater by an integral screw feed type of continuous operating pump, air pressure at the feed pump point is typically up to 2.8 kg/cm$^2$ and the quantity of air is typically 1 kg air/10 kg raw meal. This small quantity of air is mostly introduced into the preheater along with the dry raw meal feed. Accordingly, the increase in preheater exit gas volume on this account is negligible.

Moreover, the use of compressed air in pumping the dry raw meal provides for rapid and complete combustion in the separate combustion chamber 30 or 130. This results in several advantages such as for example the fact that the gaseous products of combustion in the combustion chamber 30 or 130 and the remaining quantity of excess compressed air are utilized for conveying the heated dry raw meal to the first stage cyclone preheater 14 or 114. Additionally, there is complete flexibility and control for attaining the desired amount of preheating by controlling the air and fuel mixture in the combustion chamber 30 or 130.

It is also to be noted that the raw materials used for existing suspension cyclone preheater system and rotary kiln apparatus do not pose any problems with respect to preheated dry raw meal feed. The alkali, chloride and sulfate contents of the raw meal mix and fuel should, however, be within the usual limits that apply to unpreheated raw meal feed to a suspension cyclone preheater system. Moreover, where partial bypassing of kiln gas has to be resorted to, the feeding of preheated raw meal feed will provide a positive means for reducing the adverse effect on kiln output and fuel efficiency occasioned by such partial bypassing of kiln gases.

Although the method and apparatus of the present invention providing for introduction of heated dry raw meal into the first stage of a suspension cyclone preheater system has been described with respect to a four stage cyclone preheater system, it is to be understood that the teachings of the present invention can be utilized with a single stage and a two stage cyclone preheater as well as the standard four stage cyclone preheater system. Also and as described above, the four stage cyclone preheater can also be equipped with a secondary furnace/precalcinator.

From the foregoing description it will be apparent that the method and apparatus of the present invention have a number of advantages some of which are described above and others of which are inherent in the invention. Also as described above, many modifications can be made to the method and apparatus of the present invention without departing from the teachings of the present invention. Accordingly, the scope of the present invention is only to be limited as necessitated by the accompanying claims.

I claim:

1. A method for processing raw meal in an installation for calcination of granular, powdered limestone, alumina hydrate, or the like, said method including the steps of metering dry raw meal into a processing apparatus, pneumatically pumping said raw meal in the apparatus to a separate combustion chamber, supplying fuel to said combustion chamber and igniting same, heating said dry raw meal in said combustion chamber to a temperature between 100° and 500° C., pumping said heated dry raw meal to the first stage cyclone preheater of a plurality of cyclone preheaters and processing said dry raw meal through said cyclone preheater stages to a rotary kiln whereby the temperature of the gas exiting the first cyclone preheater is between 370° and 625° C. and the thermal efficiency of said processing apparatus is improved.

2. A method for making cement clinker including the steps of metering dry raw meal into a processing apparatus, pneumatically pumping said raw meal in the apparatus to a separate combustion chamber, supplying fuel to said combustion chamber and igniting same, heating said dry raw meal in said combustion chamber to a temperature between 100° and 500° C., pumping said heated dry raw meal to the first stage cyclone preheater of a plurality of cyclone preheaters and processing said dry raw meal through said cyclone preheater stages to a rotary kiln whereby the temperature of the gas exiting the first cyclone preheater is between 370° and 625° C. and the thermal efficiency of said processing apparatus is improved.

3. The method according to claim 2 wherein a stream of dry, raw meal is pneumatically pumped to the first stage cyclone preheater and mixed with the preheated dry raw meal in the first stage cyclone preheater.

4. The method according to claim 3 wherein said preheated dry raw meal is mixed with said unpreheated dry raw meal in a ratio of 1:1.

5. The method according to claim 4 wherein said unpreheated dry raw meal is at a temperature of approximately 50° C., said preheated raw meal is preheated to a temperature of 500° C., and the resulting temperature of the combined streams of preheated dry raw meal and unpreheated dry raw meal is approximately 325° C.

6. The method according to claim 2 wherein said plurality of cyclone preheaters comprises four stage cyclone preheaters.

7. The method according to claim 6 wherein precalcinating of the raw meal is effected between the third and fourth stages of the cyclone preheaters by passing the raw meal or a portion thereof through a precalcinator furnace.

8. The method according to claim 2 wherein the fuel supplied to the separate combustion chamber is selected from the class consisting of oil, gas, and powdered coal.

9. The method according to claim 2 wherein the fuel is powdered coal and is supplied to the separate combustion chamber by mixing the powdered coal with the unpreheated dry raw meal that is fed into the separate combustion chamber such that the fuel and dry raw meal are fed simultaneously into the separate combustion chamber.

10. The method according to claim 2 wherein said fuel is ignited in the separate combustion chamber by a pilot flame provided therein.

11. The method according to claim 2 wherein the air pressure generated by the pneumatic pump for pneumatically pumping the dry raw meal is about up to 2.8 $kg/cm^2$ and the air quantity per quantity of raw meal is approximately 1 kg air/10 kg raw meal.

12. The method according to claim 2 wherein the dry raw meal feed temperature is raised in the separate combustion chamber to a temperature of approximately 350° C.

13. The method according to claim 2 wherein said processing apparatus includes a four stage cyclone preheater system having a rated output capacity of 1,000 tons of clinkers per day.

14. The method according to claim 13 wherein said dry raw meal is heated in said separate combustion chamber to a temperature of approximately 300° C.

15. The method according to claim 3 wherein the exit gases from the plurality of cyclone preheaters are recovered and supplied to a waste heat boiler for generating steam.

16. The method according to claim 15 wherein said steam generated from said waste heat boiler is used for electric power generation.

17. The method according to claim 3 wherein the heat recovered from the exit gases from the plurality of cyclone preheaters is utilized in drying a slurry of wet raw meal from which the dry raw meal is obtained.

18. A method for processing raw meal such as cement raw meal, powdered limestone, alumina hydrate or the like, said method including the steps of metering the dry raw meal into a processing system, pneumatically pumping said raw meal into said processing system to a separate combustion chamber, supplying fuel to said combustion chamber and igniting same therein, heating said dry raw meal in said combustion chamber to a temperature between 100° and 500° C., pumping said heated dry raw meal to a preheater system, processing said dry raw meal through said preheater system and supplying the preheated raw meal to a rotary kiln whereby the temperature of the gas exiting from the preheater system is increased to provide recoverable heat and whereby the thermal efficiency of said preheating system is increased.

19. A method for processing raw meal such as cement raw meal, powdered limestone, alumina hydrate or the like, said method including the steps of metering a quantity of dry raw meal into a first input stream into a processing system comprising a preheater system including at least a first stage cyclone preheater and one later stage cyclone preheater, said first stream leading directly to said first stage cyclone preheater, metering another quantity of dry raw meal and supplying it to a second input stream to said processing system for delivery to said processing apparatus, said second stream including a separate combustion chamber, supplying fuel to said combustion chamber and igniting same therein, heating said dry raw meal in said combustion chamber to a temperature between 100° and 500° C., pumping said heated dry raw meal from said combustion chamber to said later stage cyclone preheater of said preheater system, processing said dry raw meal fed into said preheater system in said two streams through said cyclone preheater system to a rotary kiln whereby the temperature of the gas exiting from the cyclone preheater system is increased so as to provide recoverable heat and whereby the thermal efficiency of said preheater system is enhanced.

20. An apparatus for processing raw meal such as cement raw meal, powdered limestone, alumina hydrate or the like, said apparatus including a dry raw meal hopper, a continuous pneumatic pump, means for metering dry raw meal to said pump from said hopper, a separate combustion chamber having an inlet coupled to the outlet of said pump, means for delivering fuel to said chamber, means for igniting said fuel in said chamber, said combustion of said fuel being controlled so as to heat said dry meal therein to a temperature of between 100° and 500° C., a cyclone preheater system, means for delivering said preheaterd dry raw meal to said cyclone preheater system and, a rotary kiln connected to the output of said cyclone preheater system.

21. The apparatus according to claim 20 wherein said cyclone preheater has a first stage cyclone preheater and at least one later stage cyclone preheater, and said preheated dry raw meal is delivered to said first stage.

22. The apparatus according to claim 21 including second means for metering dry raw meal from said hopper, and second pumping means for pumping said metered dry raw meal to said first stage cyclone preheater, the streams of preheated and unpreheated dry raw meal being mixed in said first stage cyclone preheater.

23. The apparatus according to claim 22 wherein said first and second metering means are controlled such that the ratio of preheated dry raw meal to unpreheated dry raw meal is 1:1.

24. The apparatus according to claim 22 wherein said preheated dry raw meal is heated to a temperature of approximately 500° C. and said unpreheated dry raw meal has a temperature of approximately 50° C. when the two streams are mixed in the first stage cyclone preheater.

25. The apparatus according to claim 20 wherein said cyclone preheater system includes four serially connected cyclone preheater stages.

26. The apparatus according to claim 20 wherein said fuel is powdered coal which is mixed with said dry raw meal and said means for delivering fuel to said separate combustion chamber is defined by said pneumatic pumping means.

27. The apparatus according to claim 20 wherein said means for igniting said fuel is a pilot flame in said separate combustion chamber.

28. The apparatus according to claim 20 wherein said cyclone preheater system includes a first stage cyclone preheater and at least one later stage cyclone heater, and wherein said apparatus includes second means for metering dry raw meal from said hopper and second pumping means for pumping said metered unpreheated dry raw meal to said first stage cyclone preheater.

29. The apparatus according to claim 20 including means for recovering the exit gases and heat therein from said cyclone preheater system.

30. The apparatus according to claim 29 including a waste heat boiler coupled to said means for recoving exit gases to generate steam.

31. The apparatus according to claim 30 wherein said waste heat boiler is part of an electric generation system.

32. The apparatus according to claim 29 including a wet meal drying system and said recovered exit gases are fed to said drying system.

33. The apparatus according to claim 29 including an air preheater in the input to a preheater fan for the cyclone preheater system and said recovered exit gases are fed to said air preheater for effecting heat transfer to the incoming air to heat said air fed into said cyclone preheater system.

34. The method according to claim 2 wherein air is fed to said first stage cyclone preheater and wherein the heat recovered from said exit gases is used to preheat said air fed to said first stage cyclone preheater.

35. The apparatus according to claim 2 including a second separate combustion chamber between said first combustion chamber and said preheater system for further heating said heated dry raw meal to maintain a stable temperature of the heated meal delivered to said preheater system.

* * * * *